(12) United States Patent
Hruska et al.

(10) Patent No.: US 11,536,650 B2
(45) Date of Patent: Dec. 27, 2022

(54) IMAGE SENSOR SYSTEM

(71) Applicant: VIAVI Solutions Inc., San Jose, CA (US)

(72) Inventors: Curtis R. Hruska, Cloverdale, CA (US); William D. Houck, Santa Rosa, CA (US); Valton Smith, Novato, CA (US); Marc K. Von Gunten, Novato, CA (US); Chuck Demilo, Boston, MA (US)

(73) Assignee: VIAVI Solutions Inc., Chandler, AZ (US)

( * ) Notice: Subject to any disclaimer, the term of this patent is extended or adjusted under 35 U.S.C. 154(b) by 60 days.

(21) Appl. No.: 16/949,157

(22) Filed: Oct. 15, 2020

(65) Prior Publication Data

US 2021/0116366 A1   Apr. 22, 2021

Related U.S. Application Data

(60) Provisional application No. 62/923,254, filed on Oct. 18, 2019.

(51) Int. Cl.
*G01J 3/00* (2006.01)
*G01N 21/359* (2014.01)
*G02B 19/00* (2006.01)

(52) U.S. Cl.
CPC ....... *G01N 21/359* (2013.01); *G02B 19/0066* (2013.01); *G02B 19/0076* (2013.01); *G01N 2201/063* (2013.01); *G01N 2201/0625* (2013.01); *G01N 2201/08* (2013.01)

(58) Field of Classification Search
CPC .. G01N 21/314; G01N 21/33; G01N 21/3504; G01J 3/10; G01J 3/42

USPC .......................................................... 356/51
See application file for complete search history.

(56) References Cited

U.S. PATENT DOCUMENTS

| | | | |
|---|---|---|---|
| 6,287,871 B1 | 9/2001 | Herron et al. | |
| 6,714,297 B1 | 3/2004 | Ruckstuhl et al. | |
| 2005/0013536 A1* | 1/2005 | Walt ..................... | G11B 7/1384 385/27 |
| 2006/0202133 A1 | 9/2006 | Ok et al. | |
| 2007/0206390 A1* | 9/2007 | Brukilacchio ..... | G02B 27/1086 362/555 |
| 2009/0103296 A1 | 4/2009 | Harbers et al. | |
| 2010/0148083 A1 | 6/2010 | Brown et al. | |

(Continued)

OTHER PUBLICATIONS

Denisov N.A., "Comparison of Competing Fiber Optic Probes For Tissue Fluorescence Analysis", Proceedings of SPIE, 2000, vol. 4161, pp. 234-243.

(Continued)

*Primary Examiner* — Md M Rahman
(74) *Attorney, Agent, or Firm* — Harrity & Harrity, LLP

(57) ABSTRACT

An optical sensor system may include a light source. The optical sensor system may include a concentrator component proximate to the light source and configured to concentrate light from the light source with respect to a measurement target. The optical sensor system may include a collection component that includes an array of at least two components configured to receive light reflected or transmitted from the measurement target. The optical sensor system may include may a sensor. The optical sensor system may include a filter provided between the collection component and the sensor.

20 Claims, 4 Drawing Sheets

(56) References Cited

U.S. PATENT DOCUMENTS

| | | | | |
|---|---|---|---|---|
| 2010/0328954 A1* | 12/2010 | Bodkin | .................. | H04N 5/332 |
| | | | | 362/277 |
| 2015/0247795 A1* | 9/2015 | Hruska | ................ | G01N 21/359 |
| | | | | 250/339.02 |
| 2017/0357045 A1* | 12/2017 | Carullo | ................ | G02B 6/0008 |
| 2020/0116986 A1* | 4/2020 | Saracco | .................. | G01S 17/89 |

OTHER PUBLICATIONS

International Search Report and Written Opinion for Application No. PCT/US2020/056139, dated Jan. 28, 2021, 12 pages.

\* cited by examiner

US 11,536,650 B2

IMAGE SENSOR SYSTEM

CROSS-REFERENCE TO RELATED APPLICATION

This Patent Application claims priority to U.S. Provisional Patent Application No. 62/923,254, filed on Oct. 18, 2019, and entitled "IMAGE SENSOR SYSTEM." The disclosure of the prior Application is considered part of and is incorporated by reference into this Patent Application.

BACKGROUND

A sensor device may be utilized to capture information for spectrometry analysis. For example, the sensor device may capture information relating to a set of electromagnetic frequencies. The sensor device may include a set of sensor elements (e.g., optical sensors, spectral sensors, and/or image sensors) that capture the information. Some sensor devices may be installed in consumer electronics, where size can be a constraining factor.

SUMMARY

According to some implementations, an optical sensor system may include: a light source; a concentrator component proximate to the light source and configured to concentrate light from the light source with respect to a measurement target, wherein the collection component includes an array of at least two components; a collection component configured to receive light reflected or transmitted from the measurement target; a sensor; and a filter provided between the collection component and the sensor.

According to some implementations, a device may include a light source; a compound parabolic concentrator (CPC) proximate to the light source and configured to concentrate light from the light source with respect to a measurement target; and a collection component including an array of at least two components configured to receive light reflected or transmitted from the measurement target, wherein the light is emitted via the CPC; an optical sensor; and a filter provided between the collection component and the optical sensor.

According to some implementations, a user device may include an optical sensor system, comprising a light source; a compound parabolic concentrator (CPC) proximate to the light source and configured to concentrate light from the light source with respect to a measurement target; and a collection component including an array of at least two components configured to receive light reflected or transmitted from the measurement target, wherein the light is emitted via the CPC; a sensor; and a filter provided between the collection component and the sensor.

DETAILED DESCRIPTION

Figure 1:
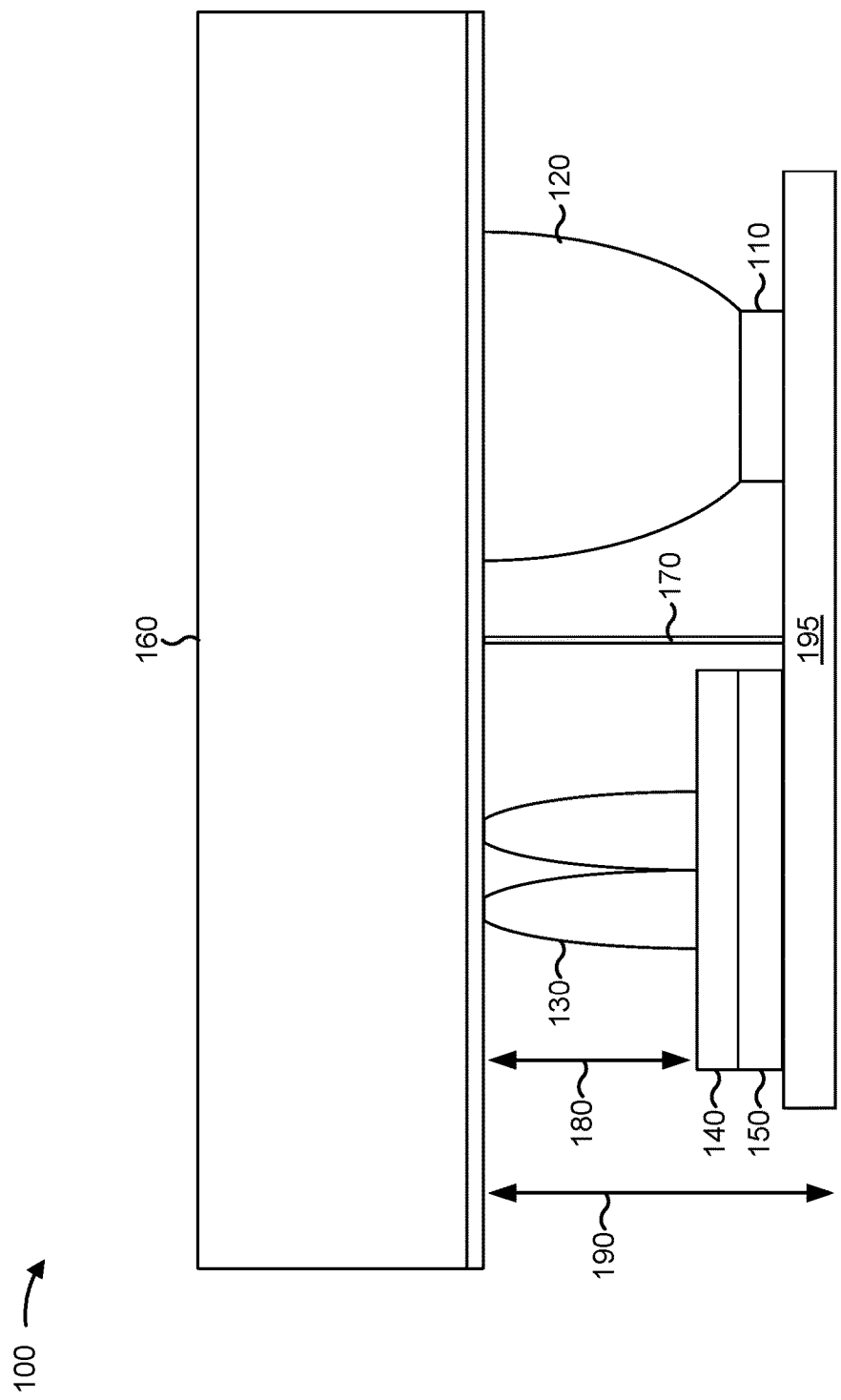
FIG. 1 is a diagram illustrating an example of an optical sensor system incorporating a collection component that comprises an array of compound parabolic concentrators.

The following detailed description of example implementations refers to the accompanying drawings. The same reference numbers in different drawings may identify the same or similar elements. In some cases, the following description uses a spectrometer as an example. However, the optical sensor system described herein may be used with any optical sensor, including but not limited to other optical sensors and spectral sensors.

An optical sensor may generate a signal based on light received by the optical sensor. In some cases, the light received by the optical sensor may be filtered. For example, the filtration of the light may enable the measurement of different wavelengths of light by the optical sensor, such as in different regions of the optical sensor. One example of such a multispectral sensor is the binary multispectral sensor.

The performance of an optical filter, such as a coated interference filter and/or the like, may be influenced by light ray angles or optical cone angles of light flux as the light passes through a filter element of the optical filter. The optical filter may operate optimally for purely collimated light that is orthogonal to the optical filter. However, collimated or slow focal angle (e.g., small aperture) conditions may be difficult to achieve for optical sensing applications involving a small spacing between the sensor and a measurement target (e.g., an object for which a measurement is to be determined based on light reflected or transmitted from the object). For example, some health-related sensing and reflectance applications may involve such spacings. In such a case, a collection component that collects the light for measurement may be a limiting factor in the spacing between the sensor and the measurement target. For example, the depth of the collection component may dictate the minimum spacing between the sensor and the measurement target.

Some implementations described herein provide an optical sensor system that transforms light to a collimated condition or a lower-angle condition than when the light was received, which may be beneficial for small optical sensor systems or optical systems where the sensor is to be located near a measurement target. For example, some implementations described herein provide a collection component for an optical sensor system that collects light reflected from a diffuse reflective medium and collimates or reduces the focal angle of the light. The collection component may use, for example, an array of compound parabolic concentrators (CPCs), an array of micro-tapers, an array of light pipes, and/or the like. The use of an array of CPCs, micro-tapers, light pipes, and/or the like reduces the size of the collection component relative to using a single monolithic CPC, micro-taper, or light pipe, and improves collimation properties of the collector component. Some implementations described herein also provide configurations and components for a light source, a concentrator component, a sensor, and a filter of the optical sensor system. Thus, a size of the optical sensor system is reduced by using an array-based collector component, thereby reducing a minimum spacing between the measurement target and the filter relative to using a monolithic collector component.

FIG. 1 is a diagram illustrating an example of a first optical sensor system 100 incorporating a collection component that comprises an array of compound parabolic concentrators. As shown, optical sensor system 100 includes a light source 110, a concentrator component 120, a collection component 130, a filter 140, and a sensor 150. A measurement target is shown by reference number 160. Furthermore, a barrier 170 may be provided between light source 110 and sensor 150, which reduces interference from light that is not reflected from the measurement target to sensor 150 via filter 140 and collection component 130.

Light source 110 includes a device capable of generating light. For example, light source 110 may include a light emitting diode (LED), such as a phosphor LED. The phosphor LED may provide light in a wavelength range of 400 nm to 1000 nm, which may enable sensing based on light in the near-infrared (NIR) range, and which may be useful for a silicon-based responsivity profile. In some implementations, light source 110 may include a plurality of LEDs. In such a case, a first LED, of the plurality of LEDs, may be associated with a different spectral range than a second LED of the plurality of LEDs. This may enable the addressing of narrow spectral ranges using a plurality of LEDs, rather than addressing a wide spectral range using a single LED.

In some implementations, light source 110 may include a modulated LED. For example, light source 110 may include a single modulated LED or a plurality of modulated LEDs. When light source 110 includes one or more modulated LEDs, the first optical sensor system 100 or a device associated with the first optical sensor system 100 may modulate a power supply of light source 110. Using a modulated LED may enable driving the LED to a higher power than a continuous-wave LED. Furthermore, modulation may improve signal to noise properties of sensing performed using light from the modulated LED.

Concentrator component 120 may include, for example, a concentrator, such as a compound parabolic concentrator (CPC) and/or the like. Concentrator component 120 may direct light emitted by light source 110 toward measurement target 160. Concentrator component 120 may be proximate to light source 110 (e.g., attached to light source 110, closer to light source 110 than collection component 130 is, configured to receive light from light source 110, and/or the like). In some implementations, concentrator component 120 may redirect or concentrate light flux from light source 110 toward measurement target 160. In some implementations, concentrator component 120 may include a solid CPC with an external coating. In some implementations, concentrator component 120 may include a hollow CPC with an internal coating (e.g., a metal coating, a dielectric coating, and/or the like). In some implementations, concentrator component 120 may have a rectangular conical geometry. In some implementations, concentrator component 120 may have a different geometry than rectangular conical (e.g., cylindrical, conical, rectangular, and/or the like).

Figure 2:
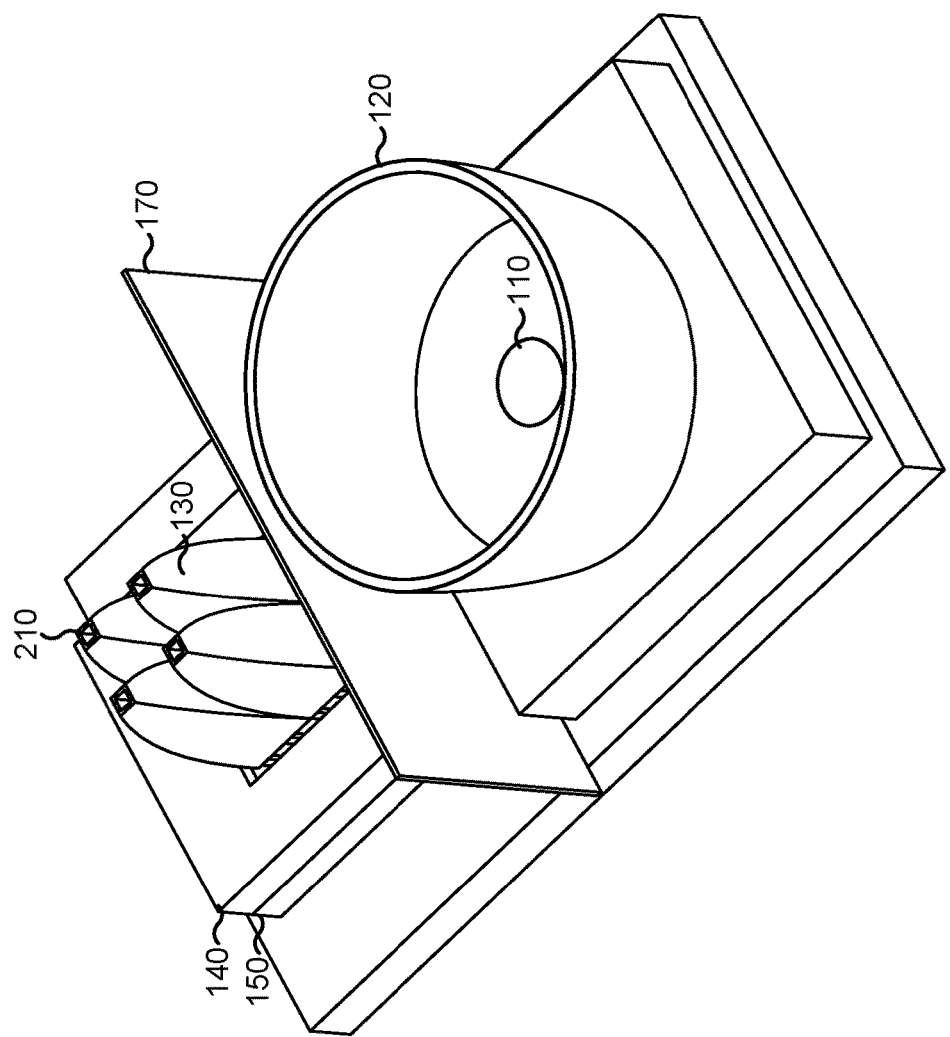
FIG. 2 is a diagram illustrating another example of an optical sensor system incorporating a collection component that comprises an array of compound parabolic concentrators.
Figure 3:
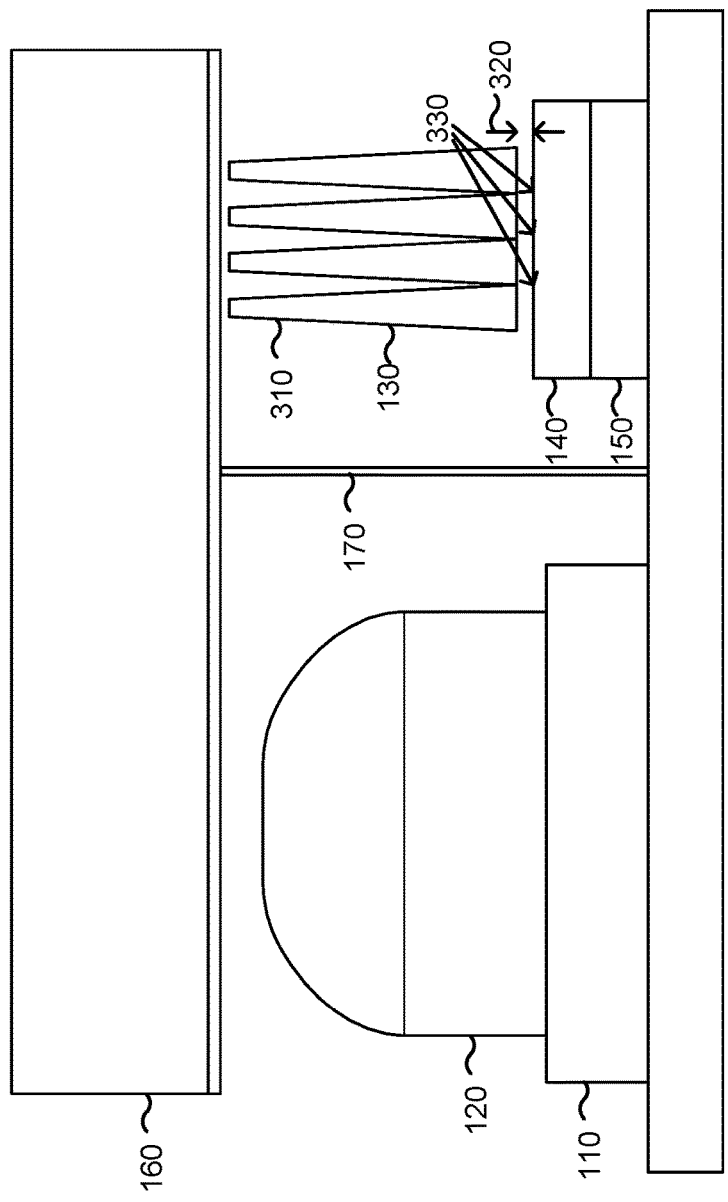
FIG. 3 is a diagram illustrating an example of an optical sensor system incorporating a collection component that comprises an array of micro-tapers.

Collection component 130 includes a device that directs light reflected from measurement target 160 to filter 140. For example, collection component 130 may be configured to receive light reflected or transmitted from the measurement target 160. In some implementations, collection component 130 may include an array of components, such as an array of CPCs (as shown in FIGS. 1 and 2), an array of micro-tapers (as shown in FIG. 3), an array of optical light pipes (not shown in FIGS. 1-3), and/or the like. Using an array of components may reduce the minimum gap 180 between filter 140 and measurement target 160 in comparison to using a monolithic collection component 130, such as a single CPC, a single micro-taper, and/or the like. Thus, the size of the first optical sensor system 100 is reduced, thereby enabling deployment in user devices or any device having size constraints.

In some implementations, collection component 130 may include an array of light pipes. For example, collection component 130 may include a plurality of collimated holes, capillary optics, and/or the like. In this case, collection component 130 may absorb or remove high angle light rays before the high angle light rays reach filter 140. A light pipe-based collection component 130 may be less costly and easier to fabricate than CPC-based or micro-taper-based collection components 130.

In some implementations, collection component 130 may include a two-dimensional array of CPCs, referred to as a CPC array. For example, collection component may include an N×N array of CPCs, where N is an integer. A larger value of N may reduce the minimum gap 180, whereas a smaller value of N may be simpler to construct or fabricate. In the first optical sensor system 100, N is equal to 2. A smaller aperture of the CPCs may face measurement target 160, and a larger aperture of the CPCs may face filter 140. Light may enter each CPC and reflect among internal walls of the CPC. This reflection of the light along a changing curved surface may convert higher angle rays to lower angle rays that are more optimally processed by filter 140. In some implementations, the N×N array of CPCs may reduce a focal length of light rays incident on filter 140 to approximately f/3.3 or slower.

In some implementations, collection component 130 may include an array of micro-tapers. The array of micro-tapers is described in more detail in connection with FIG. 3.

Filter 140 includes a spectral filter, a multispectral filter, a bandpass filter, a blocking filter, a long-wave pass filter, a short-wave pass filter, a dichroic filter, a linear variable filter (LVF), a circular variable filter (CVF), a Fabry-Perot filter, a Bayer filter, and/or the like. Filter 140 may pass one or more wavelengths of light for sensing by sensor 150. In some implementations, filter 140 may include multiple, different filters that are configured to pass respective spectral ranges to sensor 150. For example, filter 140 may include a binary filter, such as a binary multispectral filter.

Sensor 150 includes a device capable of performing a measurement of light directed toward sensor 150 (e.g., via filter 140 and/or collection component 130), such as an optical sensor, a spectral sensor, an image sensor, and/or the like. Sensor 150 may utilize one or more sensor technologies, such as a complementary metal-oxide-semiconductor (CMOS) technology, a charge-coupled device (CCD) technology, and/or the like. In some implementations, sensor 150 may include multiple sensor elements (e.g., an array of sensor elements—referred to as a sensor array) each configured to obtain information. For example, a sensor element may provide an indication of intensity of light that is incident on the sensor element (e.g., active/inactive or a more granular indication of intensity).

In some implementations, optical sensor system 100 may have a thickness 190. In some implementations, thickness 190 may be measured between a tip of collection component 130 or concentrator component 120 (e.g., an end of collection component 130 or concentrator component 120 distal from light source 110 or filter 140) and a substrate 195 (e.g., a surface of substrate 195 adjacent to sensor 150 or light source 110, or a surface of substrate 195 opposite of sensor 150 or light source 110). In some implementations, thickness 190 may be less than 3 millimeters. For example, in a near-infrared sensing application, a health parameter sensing application, or the like, thickness 190 may be less than 3 millimeters. The usage of a collection component 130 that includes an array of components (e.g., CPCs, optical tapers, light pipes, or the like) may enable a smaller thickness 190 than a collection component that utilizes a single monolithic component, as described elsewhere herein. In some implementations, thickness 190 may be greater than or equal to 3 millimeters (e.g., depending on the application). In some implementations, thickness 190 may be smaller than a thickness of an optical sensor system including a collection component that utilizes a single monolithic component.

As indicated above, FIG. 1 is provided as an example. Other examples may differ from what is described with regard to FIG. 1.

FIG. 2 is a diagram illustrating another example 200 of the first optical sensor system 100 incorporating a collection component that comprises an array of compound parabolic concentrators. Example 200 shows an isometric view of the first optical sensor system 100. As shown by reference number 210, the collection component 130 comprises a 2×2 array of CPCs in the first optical sensor system 100.

As indicated above, FIG. 2 is provided as an example. Other examples may differ from what is described with regard to FIG. 2.

FIG. 3 is a diagram illustrating an example of a second optical sensor system 300 incorporating a collection component that comprises an array of micro-tapers. The light source 110, concentrator component 120, filter 140, and sensor 150 are described in more detail in connection with FIGS. 1 and 2.

As shown by reference number 310, in some implementations, collection component 130 may comprise a plurality of optical tapers (e.g., micro-tapers, tapered optical fibers, and/or the like). An optical taper is a waveguide with an entrance aperture having a smaller dimension than an exit aperture. In some implementations, a relationship between the dimensions of the entrance aperture and the exit aperture may be linear. For example, a line connecting the entrance aperture and the exit aperture (e.g., forming a boundary of the optical taper) may be linear. In some implementations, collection component 130 may comprise an M×N array of components (e.g., optical tapers, CPCs, light pipes, collimated holes), where M and N are integers greater than zero, and where at least one of M or N is greater than one. A larger value of M or N (e.g., more components) may reduce the minimum gap between filter 140 and measurement target 160 and thus the thickness 190, whereas a smaller value of M or N (e.g., fewer components) may be simpler to construct or fabricate. In some implementations, the plurality of optical tapers may be fabricated using an injection molding process, a coating process (e.g., an electro-forming process, gold electroplating, and/or the like), and/or the like. Thus, the plurality of optical tapers may have a coating, such as gold coating, and may form a gold coated optical taper array. The usage of optical tapers for collection component 130 may provide more uniform light to filter 140 than other forms of collection component 130, and may simplify mass production.

As shown by reference number 320, in some implementations, collection component 130 may be spaced from filter 140. For example, if collection component 130 is affixed directly to filter 140, then some regions of filter 140 and sensor 150, such as the ones shown by reference number 330, may not receive light. By spacing collection component 130 from filter 140, the regions of filter 140 that do not receive light may be reduced in size or eliminated, thereby increasing the number of pixels of sensor 150 that can be used for sensing.

As indicated above, FIG. 3 is provided as an example. Other examples may differ from what is described with regard to FIG. 3.

Figure 4:
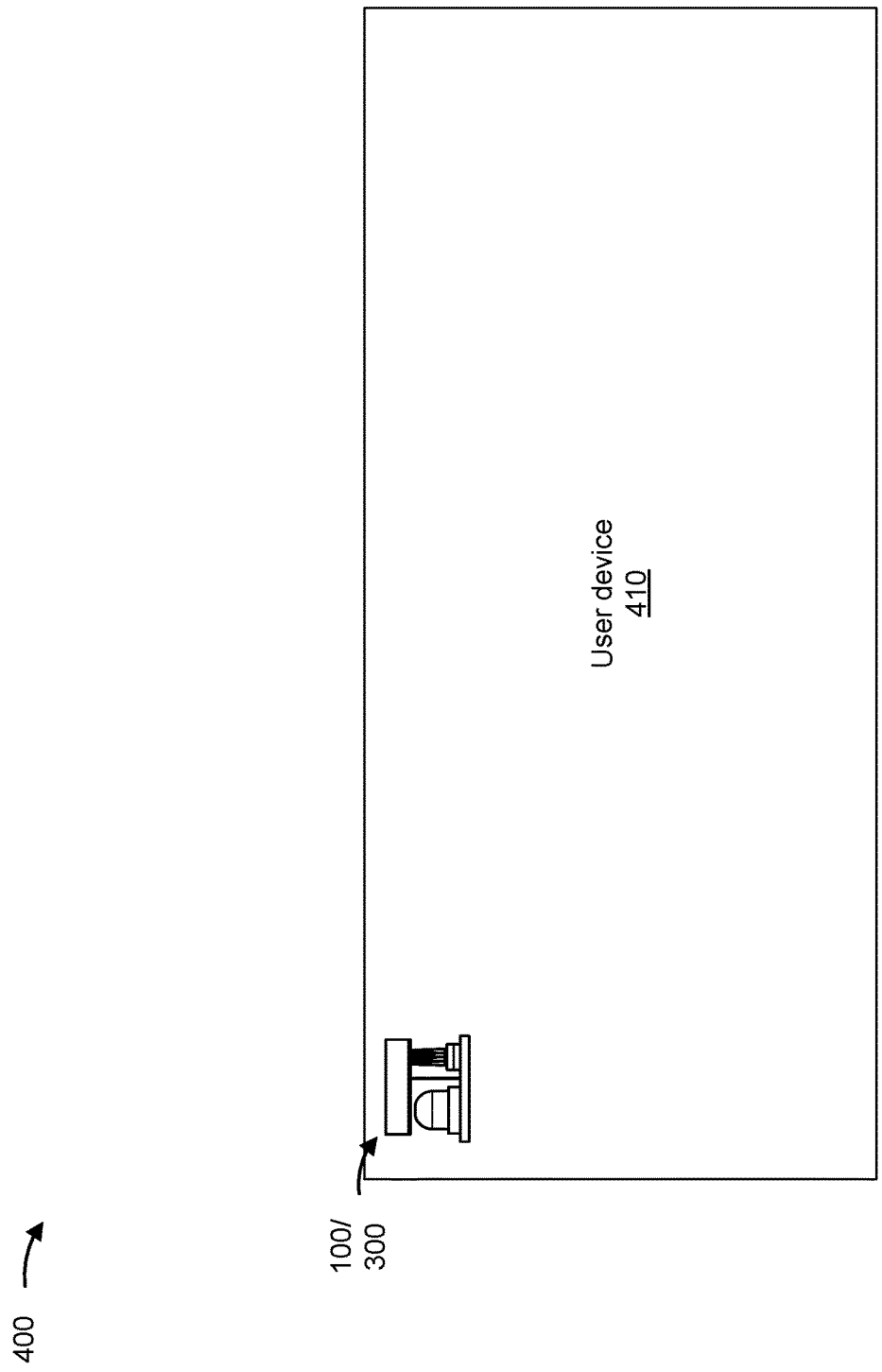
FIG. 4 is a diagram illustrating an example of a user device that includes an optical sensor system.

FIG. 4 is a diagram illustrating an example 400 of a user device 410 that may include an optical sensor system 100/300. User device 410 may include, for example, a communication and/or computing device, such as a mobile phone (e.g., a smart phone, a radiotelephone, etc.), a laptop computer, a tablet computer, a handheld computer, a desktop computer, a gaming device, a wearable communication device (e.g., a smart wristwatch, a pair of smart eyeglasses, etc.), a spectrometer, or a similar type of device. By reducing the size of optical sensor system 100/300, optical sensor system 100/300 may be implemented in smaller user devices 410, or may have a smaller footprint in a user device 410, than an optical sensor system 100/300 associated with a monolithic collection component.

As indicated above, FIG. 4 is provided as an example. Other examples may differ from what is described with regard to FIG. 4.

The foregoing disclosure provides illustration and description, but is not intended to be exhaustive or to limit the implementations to the precise forms disclosed. Modifications and variations may be made in light of the above disclosure or may be acquired from practice of the implementations.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An optical sensor system, comprising:
    a light source;
    a concentrator component configured to concentrate light from the light source with respect to a measurement target;
    a collection component configured to receive light reflected or transmitted from the measurement target, wherein the collection component includes an array of at least two components, wherein the concentrator component is one or more of:
   attached to the light source, or
   closer to the light source than the collection component;
a sensor, and
   wherein the concentrator component has a rectangular conical geometry; and
a filter provided between the collection component and the sensor.

2. The optical sensor system of claim 1, wherein the collection component comprises a plurality of collimated holes.

3. The optical sensor system of claim 1, wherein the array comprises an array of optical tapers.

4. The optical sensor system of claim 1, wherein the array comprises an array of optical light pipes.

5. The optical sensor system of claim 1, wherein the light source comprises a phosphor light emitting diode (LED).

6. The optical sensor system of claim 1, wherein the light source is configured to emit light in a wavelength range of 400 nm to 1000 nm.

7. The optical sensor system of claim 1, wherein the light source comprises a plurality of light emitting diodes (LEDs), wherein a first LED, of the plurality of LEDs, is associated with a different spectral range than a second LED of the plurality of LEDs.

8. The optical sensor system of claim 1, wherein the light source comprises a modulated light emitting diode.

9. The optical sensor system of claim 1, wherein the concentrator component comprises a compound parabolic concentrator array.

10. The optical sensor system of claim 9, wherein the compound parabolic concentrator array is a two-dimensional array.

11. A device, comprising:
   a light source;
   a compound parabolic concentrator (CPC) proximate to the light source and configured to concentrate light from the light source with respect to a measurement target,
      wherein the CPC has a rectangular conical geometry;
   a collection component including an array of at least two components configured to receive light reflected or transmitted from the measurement target, wherein the light is emitted via the CPC;
   an optical sensor; and
   a filter provided between the collection component and the optical sensor.

12. The device of claim 11, wherein the CPC is a solid compound parabolic concentrator (CPC) with an external coating.

13. The device of claim 11, wherein the CPC is a hollow compound parabolic concentrator (CPC) with a metal or dielectric internal coating.

14. The device of claim 11, wherein the collection component comprises a two-dimensional array of optical light pipes.

15. The device of claim 11, wherein the filter is spaced from the collection component.

16. A user device, comprising:
   an optical sensor system, comprising:
      a light source;
      a compound parabolic concentrator (CPC) configured to concentrate light from the light source with respect to a measurement target,
         wherein the CPC has a rectangular conical geometry; and
      an array configured to receive light reflected or transmitted from the measurement target,
         wherein the light is emitted via the CPC, and
         wherein the CPC is one or more of:
            attached to the light source, or
            closer to the light source than the array.

17. The user device of claim 16, wherein the array comprises a gold coated optical taper array.

18. The user device of claim 16, further comprising:
   a sensor; and
   a filter provided between the array and the sensor,
      wherein the filter is spaced from the array.

19. The user device of claim 16, further comprising:
   a sensor,
      wherein the array comprises a different compound parabolic concentrator, and
      wherein an aperture of the different compound parabolic concentrator is proximate to the sensor.

20. The user device of claim 16, wherein the CPC is closer to the light source than the array.

* * * * *